United States Patent [19]
Sühring

[11] Patent Number: 5,988,529
[45] Date of Patent: Nov. 23, 1999

[54] LIQUID SPRAYING ARRANGEMENT FOR WINDOWS

[75] Inventor: Axel Sühring, Wolfsburg, Germany

[73] Assignee: Volkswagen AG, Wolfsburg, Germany

[21] Appl. No.: 08/926,545

[22] Filed: Sep. 10, 1997

[30] Foreign Application Priority Data

Sep. 19, 1996 [DE] Germany .......................... 196 38 302

[51] Int. Cl.⁶ ....................................................... B05B 1/10
[52] U.S. Cl. .................... 239/284.1; 239/381; 239/589.1
[58] Field of Search ................... 239/284.1, 318, 239/225.1, 231, 232, 251, 380, 381, 389, 436, 533.1, 548, 589.1; 137/829, 830, 624.14

[56] References Cited

U.S. PATENT DOCUMENTS 3,008,649 11/1961 Bock et al. ........................... 239/284.1
4,896,383 1/1990 Morgan et al. ......................... 239/318

FOREIGN PATENT DOCUMENTS

| 2059513 | 4/1978 | Germany | ............................... 137/829 |
| 2534288 | 6/1984 | Germany . | |
| 2560546 | 2/1988 | Germany . | |
| 3724765 | 4/1996 | Germany . | |
| 1264987 | 10/1986 | Russian Federation | ............ 239/589.1 |
| 1426641 | 9/1988 | Russian Federation | ............... 239/381 |

*Primary Examiner*—Andres Kashnikow
*Assistant Examiner*—Dinh Q. Nguyen
*Attorney, Agent, or Firm*—Baker & Botts, L.L.P.

[57] ABSTRACT

A liquid spray arrangement for a window has a spray nozzle which includes an inflow chamber, an interaction chamber, and an oscillator in the interaction chamber. The oscillator divides the interaction chamber into two spray channels and is caused to oscillate by the flow of a cleaning liquid, as a result of which a spray jet is sprayed onto the window alternately at two different angles. This makes it possible to increase the proportion of cleaning liquid which contributes to the cleaning of the window, and thus to reduce the volume of cleaning liquid in the storage container.

13 Claims, 4 Drawing Sheets

LIQUID SPRAYING ARRANGEMENT FOR WINDOWS

BACKGROUND OF THE INVENTION

This invention relates to liquid-spraying arrangements for spraying a cleaning liquid on windows, such as motor vehicle windows, in which a spray has a liquid inflow chamber, through which cleaning liquid is received, and an interaction chamber having at least one outlet opening, through which the cleaning liquid flows out.

A liquid spraying arrangement of this type is disclosed in U.S. Pat. No. 3,973,558 which also describes an associated method for applying liquid to a window in a fan-like manner.

The disadvantage of such arrangements, however, is that very narrow channels have to be provided in order to make the water jet oscillate back and forth. Because of the desired fluid mechanics, it is not possible, with the desired volume flow, to increase the size of the channels since, otherwise, the water jet will not be made to oscillate as desired.

The disadvantage of having narrow channels is that in winter, at low temperatures, the cleaning liquid freezes very easily in the channels. If the cleaning liquid freezes in the channels, then the lack of liquid flow into the channels means that the oscillating movement of the water jet is no longer produced.

In addition, in order to prevent freezing, a nozzle of this type must be heated. Furthermore, with such narrow channels the oscillating water jet cannot be deflected in a different direction since, this would cause the desired flow effect to be lost.

A further disadvantage is that the emerging water jet is distributed over the window in a fan-like manner, i.e. the liquid is applied to a poorly defined region of the window and thus the majority of the cleaning liquid is not used for specific cleaning of the window.

U.S. Pat. No. 4,732,325 discloses a spray arrangement having a nozzle body which is mounted so that it can be tilted, the nozzle body being driven by a turbine which is caused to rotate by the water jet.

In this arrangement, the nozzle body is made to tilt by a comparatively complex and expensive mechanism. Moreover, in this case also the water jet can only be distributed in a fan-like manner.

It is not possible with this arrangement for the cleaning liquid to be sprayed alternately through two water jets which are spaced apart at an angle.

SUMMARY OF THE INVENTION

Accordingly, it is an object of the present invention to provide a liquid spray arrangement for windows which overcomes the disadvantages of the prior art.

Another object of the invention is to provide a liquid spray arrangement by which a cleaning liquid can be sprayed onto a window alternately in different directions and in which the oscillating movement of the jet is produced, using a simple mechanism, by the flow of the cleaning liquid itself.

A further object of the invention is to provide a liquid spraying arrangement which does not lose its ability to function by freezing at low temperatures.

These and other objects of the invention are attained by providing a liquid spray arrangement having a spray nozzle with a liquid-receiving chamber and an interaction chamber, and an oscillator disposed in the interaction chamber so that it divides the interaction chamber into two spray channels and is caused to oscillate by the flow of the cleaning liquid in the interaction chamber.

If desired, the liquid receiving chamber and the interaction chamber may constitute a single chamber having a liquid-receiving region into which the cleaning liquid flows and an interaction region subdivided into two channels by the oscillator.

To provide the oscillating movement the oscillator is rotatably mounted on a pin and the compressive forces of the cleaning fluid acting on the lateral surfaces of the oscillator are changed automatically by oscillator motion. The forces exerted on the oscillator are the impulsive forces of the flowing liquid, and the forces on the oscillator which result from static pressure differences in the two spray channels.

In one embodiment of the invention the oscillator is subdivided by the pin into an outflow end and an inflow end so that the outflow end is longer than the inflow end.

This arrangement provides a simple way of producing the oscillating movement as a result of the flow of the cleaning liquid. The details of the flow mechanism are explained hereinafter with reference to an exemplary embodiment.

In operation, the entire flow of liquid during a spray operation passes through each of the two spray channels, which results in a sufficient channel width to assure that the cleaning liquid does not freeze even at very low temperatures.

If desired, a defined separation of the spray jets can be achieved, in the stop position of the oscillator, by selectively closing the spray channels at the inflow end and/or at outflow end.

In a further embodiment, the spray channels are connected to outflow channels which have a common angle adjustment device or separate angle-adjustment devices, such as adjustment balls containing the outflow channels. It is thus possible for the direction of each of the jets sprays to be set individually. The point of contact of each of the jet sprays with the window can thus be set so that it precisely covers the field of vision of the driver which is to be cleaned. Automatic spray-height adjustment depending on the vehicle speed or manual spray-height adjustment from the vehicle interior is also possible.

By using such spray jets that can be adjusted and sprayed alternately at different angles, it is possible to adapt the cleaning of the window specifically to the requirements of the driver and thus to reduce the proportion of the cleaning liquid used which does not contribute to the cleaning of the window. Less cleaning liquid is thus required to provide the same cleaning performance when cleaning the window, and the volume of the cleaning-liquid storage container can be correspondingly reduced without decreasing the intervals between filling of the storage container.

The nozzle has a simple construction and is inexpensive to produce and, because of the simplicity of the flow mechanism which triggers the oscillating movement, has a high functional reliability.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
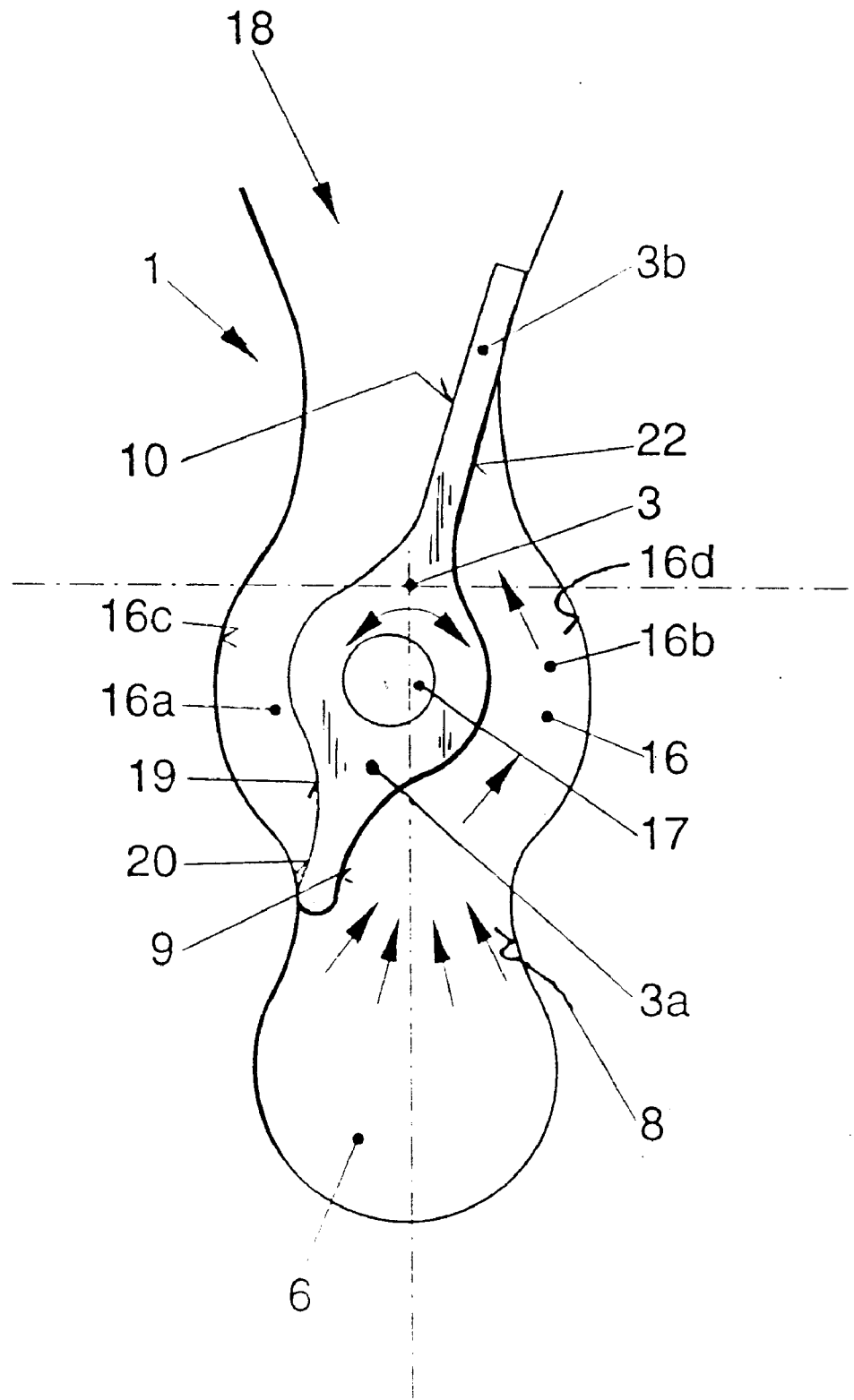
FIG. 1 is a side view showing a representative embodiment of a liquid spray arrangement according to the invention.

In the typical embodiment of the invention shown in FIG. 1 a spray nozzle 1 has a liquid-receiving inflow chamber 6 and an interaction chamber 16 and an oscillator 3 mounted in the interaction chamber 16 so that it can pivot around a pin 17, the pin being located off center in the interaction chamber 16. In this embodiment, the inflow chamber 6 is separated from the interaction chamber 16 by a narrowed section. The narrowed section, however, is not absolutely necessary. It is also possible for the interaction chamber to merge into the inflow chamber without any defined transition, so that the two chambers form a single chamber. The oscillator 3 subdivides the interaction chamber 16 into two spray channels 16a and 16b. Cleaning liquid flows from the inflow chamber 6 into the interaction chamber 16 and, from there, is sprayed onto a window (not illustrated) from an outlet opening 18.

Spray nozzles of this type are used, for example, for cleaning motor vehicle windows, the spray nozzle being arranged on or beneath the hood of the vehicle. As a result of an oscillating movement of the oscillator 3, cleaning liquid is sprayed onto the vehicle windshield alternately through the two spray channels 16a and 16b. The flow mechanism which causes the oscillating liquid movement will be explained in more detail hereinafter. The oscillating movement of the oscillator alternately narrows the inflow-end and/or outflow-end opening of the spray channels 16a and 16b so that the cleaning liquid is channeled alternately through the two spray channels. The direction of flow of the spray is determined by the geometry of the spray channels 16a and 16b.

The geometry of the spray channel 16a is determined by the oscillator and interaction chamber surfaces 10, 16c, 19 and 20 and the geometry of the spray channel 16b is determined by the oscillator and interaction chamber surfaces 8, 9, 16d and 22. In order to enhance the alternate outflow of the cleaning liquid, the oscillating movement may be such that the oscillator 3, in its stop positions, closes the inflow openings to the spray channels 16a and 16b by the surface 9 butting against the surface 8 or by the surface 19 butting against the surface 20. When the inflow to one spray channel (e.g. the spray channel 16a in FIG. 1) is closed, the outflow of the other spray channel (the spray channel 16b) in FIG. 1 is also closed.

In this case, spraying takes place each time through one of the spray channels 16a and 16b while the other spray channel is being filled.

The oscillating movement is produced as follows:

The oscillator 3 is initially located in any position. The cleaning liquid flows into the interaction chamber from the inflow chamber 6 and, by virtue of the impulsive force on the surface 9 or 19, moves the oscillator into one of the two stop positions, with the result that the surfaces 19 and 20 or 9 and 8 butt against one another. In the condition shown in FIG. 1, the surface 19 butts against the surface 20. The flow of the cleaning liquid causes different forces to act on the inflow end 3a and outflow end 3b of the oscillator. These forces may be produced in a simple manner by speeding up or slowing down the flow of cleaning liquid. Thus, the spray channel 16a or 16b may be opened at the outflow end 3b of the oscillator 3 by decreasing the flow speed and increasing the static pressure in the flow. Even if the ends 3a and 3b of the oscillator are of equal length, this has the effect of causing a higher pressure to be applied at the outflow end, in the channel through which flow takes place, than at the inflow end, and the oscillator is thus made to pivot in the counterclockwise direction from the position shown in FIG. 1 until its surface 9 butts against the surface 8. However, with a constant spray-channel width in the stop position, the pivot movement may also be achieved by the outflow end of the oscillator being longer than the inflow end. On account of the constant channel width, and with constant channel height, the static pressure is likewise constant along one stream filament. Since the surface of the outflow end is larger than the surface of the inflow end, the force applied to the oscillator at the outflow end is greater than that at the inflow end. The pivot movement is then triggered because of the imbalance of forces.

As the pivot movement commences, some of the cleaning liquid also begins to flow into the spray channel 16a. The proportion of the cleaning liquid which flows into the spray channel 16a increases as the pivot angle of the oscillator 3 increases, until the surface 9 butts against the surface 8, causing the inflow to the spray channel 16b to be closed and the cleaning liquid being sprayed onto the window exclusively from the spray channel 16a. The pivot movement may also be triggered by impulsive forces exerted on the oscillator by the cleaning liquid. The impulsive forces acting on the oscillator may be specifically influenced by the shape of the oscillator. The oscillator may thus have, for example, thickened sections at certain points, these sections providing resistance to the flow and producing impulsive forces which act on the oscillator.

Figure 2:
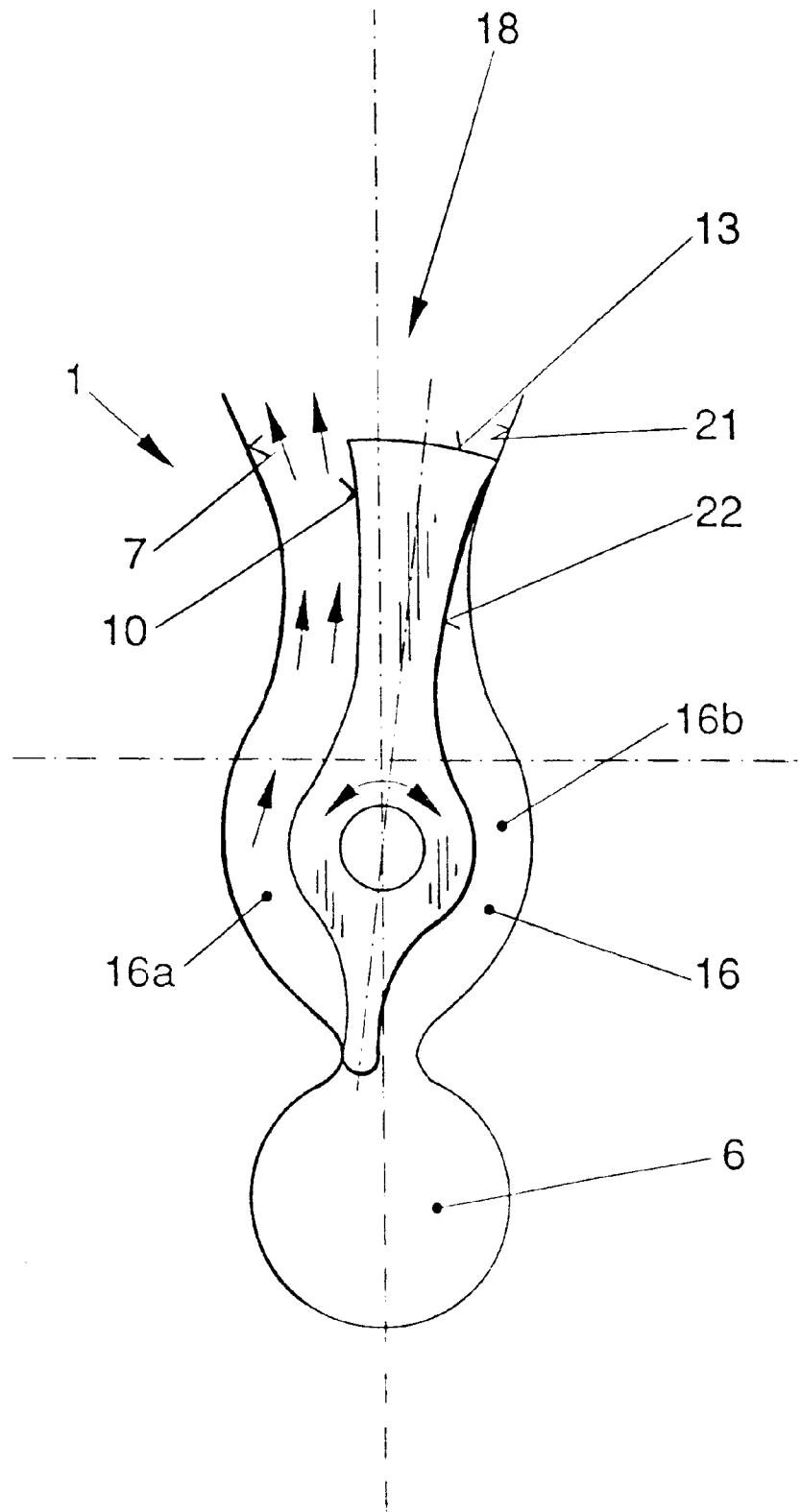
FIG. 2 is a similar view showing another representative embodiment of a liquid spray arrangement in which the spray channel is closed at the outflow end.

In the embodiment shown in FIG. 2, a surface 22 of the oscillator butts against a surface 21 of the outlet opening and thus closes the spray channel 16b at the outflow end. The cleaning liquid then exerts an impulsive force on the outflow end 3b of the oscillator, and this causes the oscillator to pivot toward the opposite spray channel surface.

It is conceivable, in theory, for the oscillator to remain in the central position in the nozzle and for the cleaning liquid to be sprayed onto the window through two spray channels simultaneously. In such cases, however, vibrations which occur in a vehicle will always deflect the oscillator out of the central position and thus trigger the oscillating movement.

Figure 3:
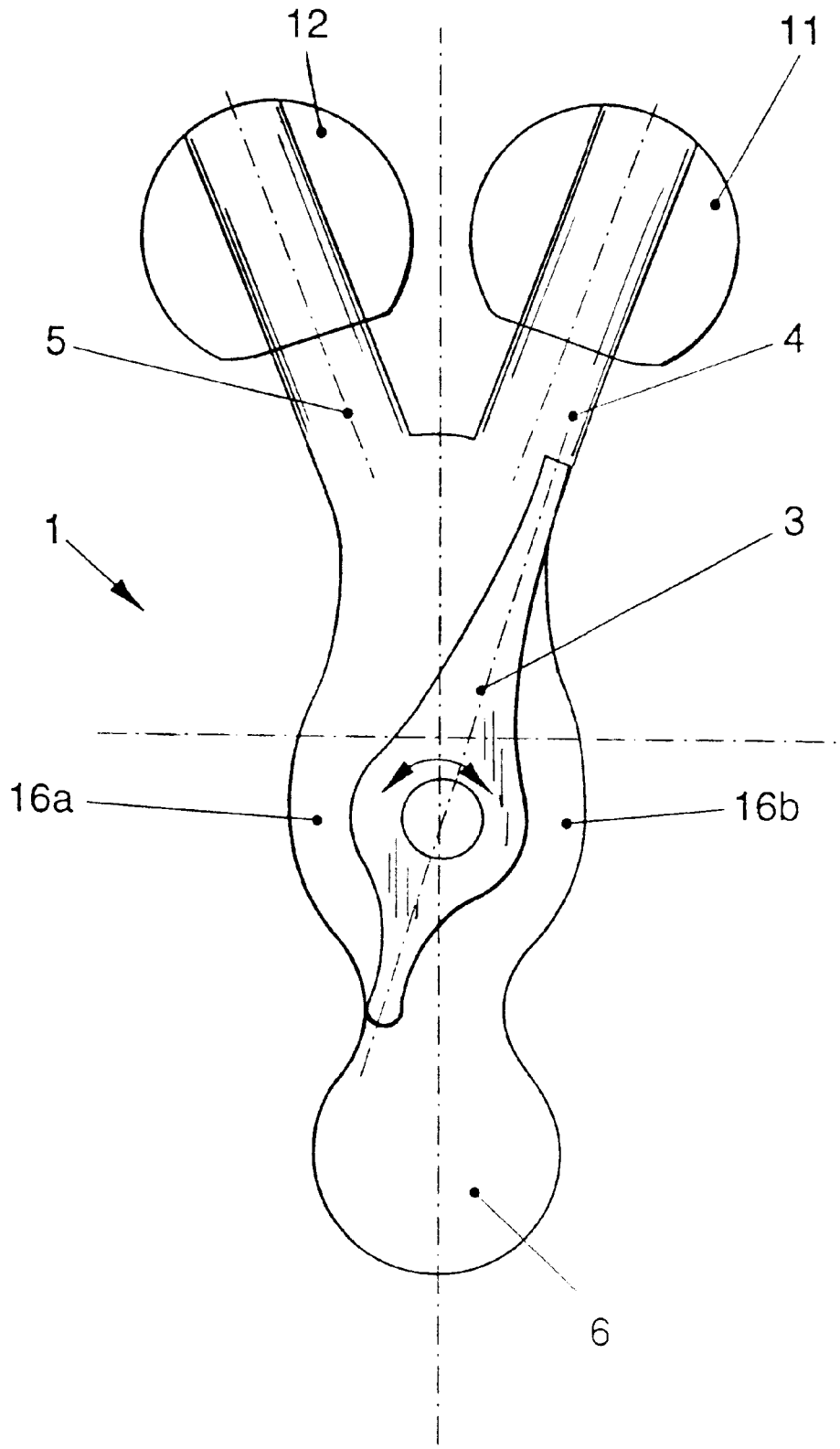
FIG. 3 is a view showing a further embodiment with two outflow channels.

In the embodiment shown in FIG. 3, a specific separation of the spray jets leading from the spray channels 16a and 16b is achieved by providing separate outflow channels 4 and 5 for the spray channels 16b and 16a, respectively, as shown in FIG. 3. At least part of the outflow channels may pass through corresponding direction control balls 11 and 12. This makes it easy to adjust the angle of contact of the spray on the window.

Figure 4:
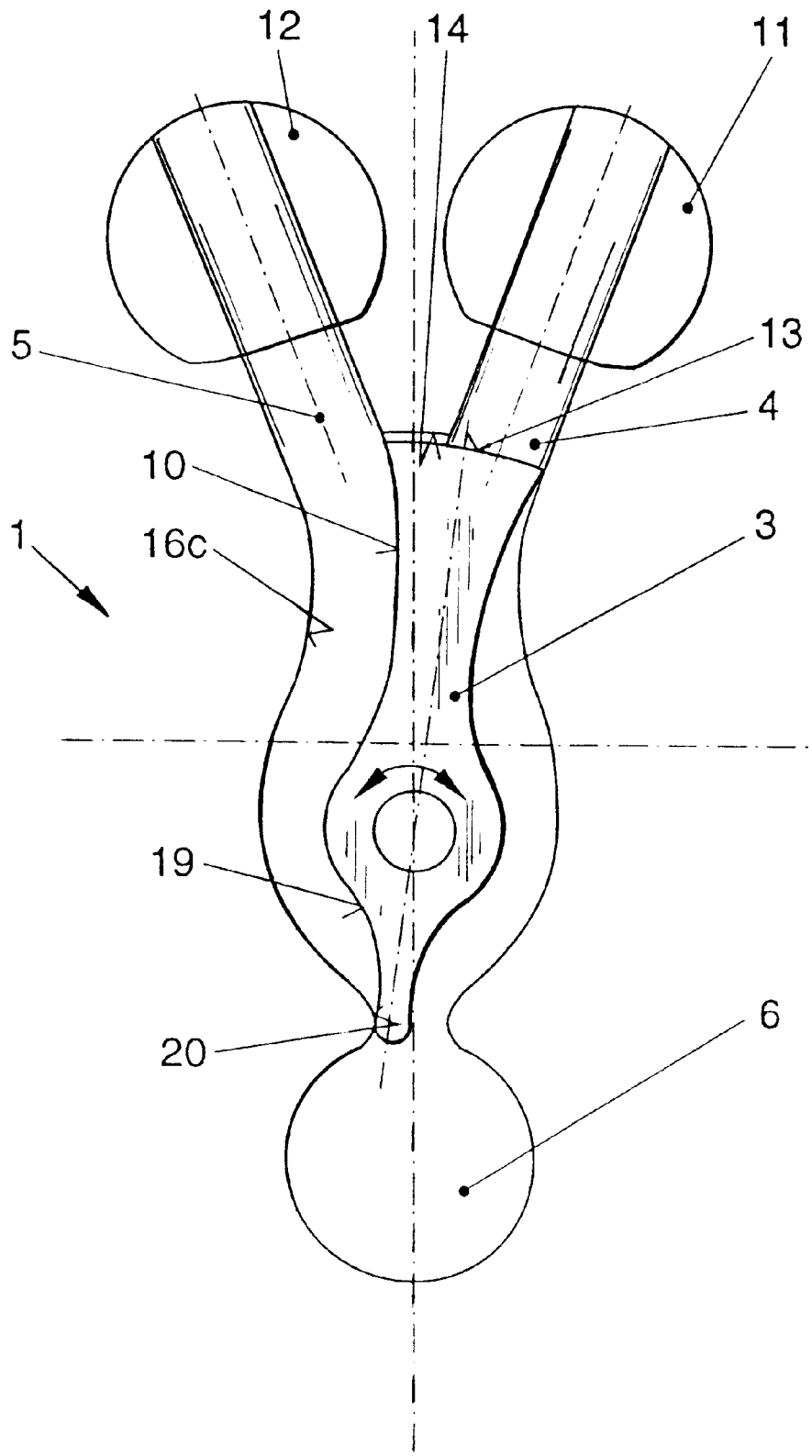
FIG. 4 is a view showing another embodiment having two outflow channels, one of which is closed by the oscillator.

In the embodiment shown in FIG. 4, the surfaces 10 and 22 are shaped so that, in each stop position of the oscillator, the spray channel 16a or 16b, formed by the surfaces 10, 19 and 16c or 22, 9 and 16d, through which the cleaning liquid is being sprayed merges continuously into a corresponding outflow channel 4 or 5. The alternate outflow is further enhanced by providing an end surface 13 on the oscillator which closes an outflow channel 4 or 5 when the oscillator is in a stop position.

Although the invention has been described herein with reference to specific embodiments, many modifications and variations therein will readily occur to those skilled in the art. Accordingly, all such variations and modifications are included within the intended scope of the invention.

I claim:

1. A liquid spray arrangement for a window comprising a spray nozzle for directing a cleaning liquid onto a window, the spray nozzle having an inflow chamber which receives cleaning liquid, and an interaction chamber with at least one outlet opening, through which the cleaning liquid flows out of the nozzle, and an oscillator in the interaction chamber supported for pivoting motion around a pin, the interaction chamber being divided into two separate spray channels by the oscillator so that the cleaning liquid can be sprayed onto the window alternately at different angles from the two spray channels by an oscillating movement of the oscillator, wherein the oscillator is divided by the center point of the pin into an outflow end which extends toward the outlet opening and an inflow end which extends toward the inflow chamber and wherein the inflow end of the oscillator alternately closes each of the two separate spray channels.

2. A liquid spray arrangement according to claim 1 wherein the inflow chamber and the interaction chamber are formed into a single chamber.

3. A liquid spray arrangement according to claim 1 wherein the outflow end of the oscillator is longer than the inflow end.

4. A liquid spray arrangement according to claim 1 wherein the outflow end of the oscillator has lateral surfaces and the inflow end has lateral surfaces, and wherein the oscillator can be made to pivot by forces exerted by the cleaning liquid on the lateral surfaces.

5. A liquid spray arrangement according to claim 4 wherein the interaction chamber and the oscillator have abutment surfaces arranged so that, when facing lateral abutment surfaces of the oscillator and the interaction chamber are engaged at at least one point, inflow of the cleaning liquid to one of the spray channels is interrupted.

6. A liquid spray arrangement according to claim 4 wherein a lateral surface of the oscillator can engage one of the internal surfaces of the interaction chamber outlet opening at at least one point to close one of the spray channels.

7. A liquid spray arrangement according to claim 1 wherein the oscillator has an outflow-end surface and at least part of the outlet opening from the interaction chamber can be closed by the outflow-end surface of the oscillator.

8. A liquid spray arrangement according to claim 1 wherein the outlet opening has two separate outflow channels which are spaced apart at an angle and the spray channels can be connected to the outflow channels so that the cleaning liquid can be sprayed through the outflow channels at different angles onto the window.

9. A liquid spray arrangement according to claim 8 wherein, when one surface of the oscillator engages a surface of the interaction chamber, a spray channel is formed which merges continuously into the outflow channel.

10. A liquid spray arrangement according to claim 8 wherein when either of two opposite surfaces of the oscillator engages a corresponding inner surface of the interaction chamber, a spray channel is formed which mergers continuously into the outflow channel.

11. A liquid spray arrangement to claim 8 wherein the oscillator has an outflow-end surface which closes the opening of one of the spray channels facing the outflow channels.

12. A liquid spray arrangement according to claim 8 wherein the outflow channels have an angle-adjustment device.

13. A liquid spray arrangement to claim 12 wherein the angle-adjustment device is an adjustment ball which contains at least part of an outflow channel.

* * * * *